BEST AVAILABLE COPY

DEFENSIVE PUBLICATION T857,013

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 10, 1968

857 O.G. 367

753,838

ORIENTED POLYARYLSULPHONE FILM

Brian Edmund Jennings, Digswell, England, assignor to Imperial Chemical Industries Limited, London, England, a corporation of Great Britain

Continuation of application Ser. No. 451,336, Apr. 27, 1965. This application Aug. 8, 1968. Published Dec. 10, 1968

Claims priority, application Great Britain, May 1, 1964, 18,228/64

Class 260—49

No Drawing. 9 Pages Specification

An oriented film of a polyarylsulphone which is formed of repeating units of the formula —Ar—$So_2$— where Ar is a divalent aromatic residue derived from benzene, a polynuclear hydrocarbon, diphenyl or a compound of Formula I

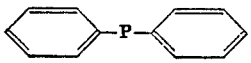

(I)

where P is —O—, —S—, —SO—, a divalent hydrocarbon radical, a substituted divalent hydrocarbon, a residue of a diol containing only carbon atoms or groups of the structure —C—O—C— and —C—S—C— in the chain between the hydroxyl groups, or Ar is a substituted derivative of any such aromatic residue wherein one or more of the hydrogen atoms bound to aromatic rings are substituted by other monovalent atoms or groups, and Ar may vary from unit to unit in the polymer chain, and a minor proportion of the —$SO_2$— links may be replaced by —CO— links. The Ar residues may be derived from diphenyl ether or diphenyl sulphide and optionally in minor proportion from diphenyl. Orientation is accomplished by stretching the film at elevated temperature. Stretching may be effected in one direction or either sequentially or simultaneously in two directions. Temperatures between 240° C. and 275° C. may be used.